US012776644B2

(12) United States Patent
Chen et al.

(10) Patent No.: US 12,776,644 B2
(45) Date of Patent: Oct. 27, 2026

(54) CURRENT LIMITING SYSTEMS AND ASSOCIATED METHODS

(71) Applicant: Analog Devices, Inc., Wilmington, MA (US)

(72) Inventors: Hua Chen, Monterey, CA (US); Bin Zhang, Durham, NC (US); Qiwei Chen, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 211 days.

(21) Appl. No.: 18/667,353

(22) Filed: May 17, 2024

(65) Prior Publication Data

US 2025/0357752 A1 Nov. 20, 2025

(51) Int. Cl.
*H02H 9/02* (2006.01)

(52) U.S. Cl.
CPC .................................. *H02H 9/025* (2013.01)

(58) Field of Classification Search
CPC ................................ H02H 9/025; H02H 9/02
USPC ........................................................ 361/93.9
See application file for complete search history.

(56) References Cited

U.S. PATENT DOCUMENTS

| | | | | |
|---|---|---|---|---|
| 3,529,210 | A * | 9/1970 | Wada | H02H 3/025 361/58 |
| 2005/0088899 | A1* | 4/2005 | Regev | G11C 7/067 365/222 |
| 2017/0110876 | A1* | 4/2017 | Wohlfarth | H02H 9/005 |
| 2023/0163676 | A1* | 5/2023 | Abesingha | H02M 1/0009 323/271 |
| 2023/0318875 | A1* | 10/2023 | Swarr | H04L 41/022 370/254 |
| 2023/0324871 | A1* | 10/2023 | Strütt | G05B 19/0428 700/79 |

* cited by examiner

*Primary Examiner* — Sreeya Sreevatsa
(74) *Attorney, Agent, or Firm* — ArentFox Schiff LLP

(57) ABSTRACT

A current limiting system includes a plurality of current limiting devices electrically coupled in series to form a protected power path, where each current limiting device is configured to individually limit magnitude of an electric current flowing through the protected power path to a respective current limit value. Each current limiting device is further configured to control its respective current limit value such that (i) the respective current limit value is a respective constant current value when a magnitude of a respective supply voltage of the current limiting device is above a first voltage threshold value and (ii) the respective current limit value is less than the respective constant current value of the current limiting device when the magnitude of the respective supply voltage of the current limiting device is below the first voltage threshold value.

20 Claims, 10 Drawing Sheets

CURRENT LIMITING SYSTEMS AND ASSOCIATED METHODS

BACKGROUND

Current limiting systems are commonly used with electric ports delivering energy from an electric power supply to a load. The current limiting systems limit magnitude of current flowing through the electric ports to prevent an unsafe operating condition, as well as to prevent equipment damage, resulting from an overcurrent condition. For example, electric ports in Advanced Physical Layer (APL) systems, as well as electric ports in Single-pair Power over Ethernet (SPoE) systems, are normally protected by current limiting systems. Additionally, some applications, such as explosive environment applications, require current limiting systems with redundant current limit circuitry which will tolerate a minimum specified number of faults, to achieve intrinsic safety.

DETAILED DESCRIPTION OF THE EMBODIMENTS

Figure 1:
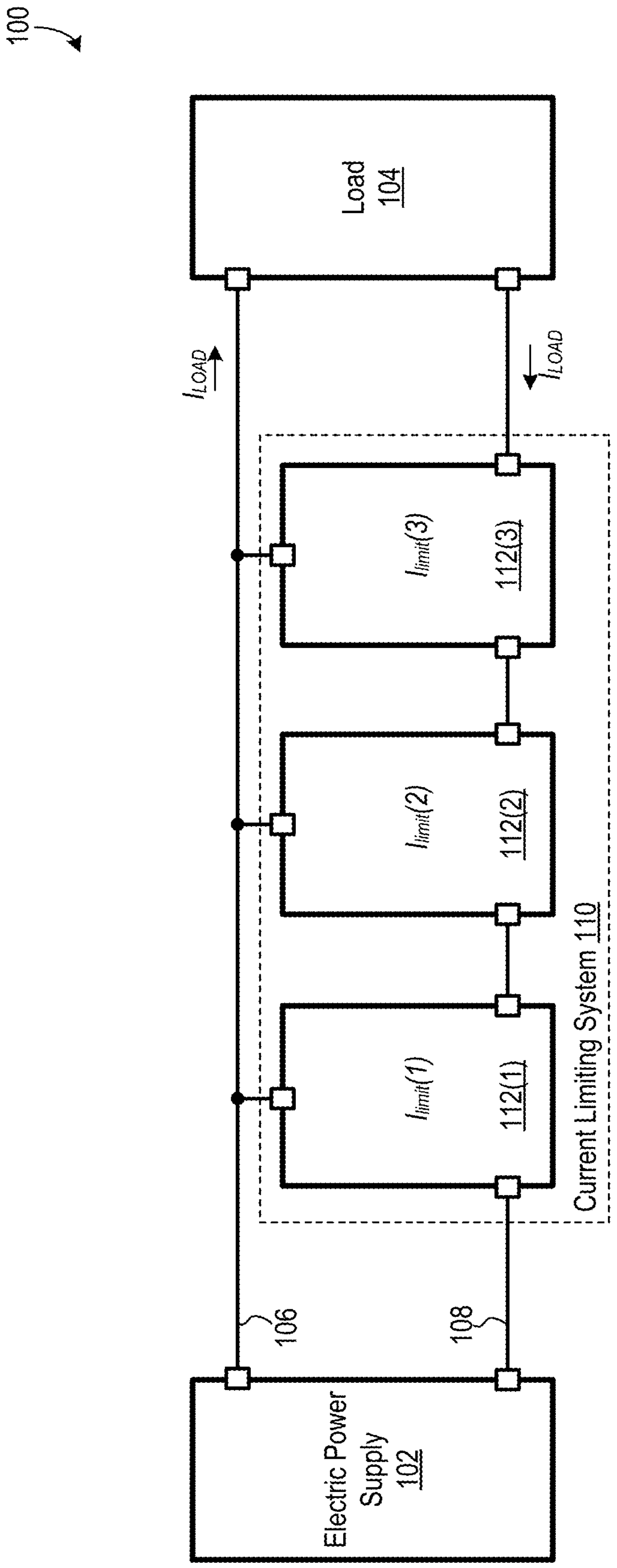
FIG. 1 is a schematic diagram of an electrical environment including a current limiting system.

A current limiting system with redundant current limiting circuitry can be realized by electrically coupling two or more current limiting devices in series in a power delivery path, where each current limiting device is capable of limiting magnitude of current flowing through the power delivery path without assistance from any other current limiting device. For example, FIG. 1 is a schematic diagram of an electrical environment 100 including an electric power supply 102, a load 104, a forward power path 106, a return power path 108, and a current limiting system 110. Forward power path 106 and return power path 108 electrically couple load 104 to electric power supply 102, and an electric current $I_{LOAD}$ flows between electric power supply 102 and load 104 via forward power path 106 and return power path 108. Current limiting system 110 includes three current limiting devices 112 electrically coupled in series along return power path 108. Each current limiting device 112 is also electrically coupled to forward power path 106. In this document, specific instances of an item may be referred to by use of a numeral in parentheses (e.g. current limiting device 112(1)) while numerals without parentheses refer to any such item (e.g. current limiting devices 112).

Each current limiting device 112 is configured to limit magnitude of electric current $I_{LOAD}$ flowing through return power path 108 to a respective fixed current limit value $I_{limit}$ without assistance from any other current limiting device 112. For example, current limiting device 112(1) is configured to limit magnitude of electric current $I_{LOAD}$ to a respective current limit value $I_{limit}$(1), irrespective of operation of current limiting devices 112(2) and 112(3). As another example, current limiting device 112(2) is configured to limit magnitude of electric current $I_{LOAD}$ to a respective current limit value $I_{limit}$(2), irrespective of operation of current limiting devices 112(1) and 112(3). As such, current limiting system 110 is fault tolerant because up to two instances of current limiting device 112 can fail (short circuit) without compromising the safety of current limiting system 110.

However, unintended variations among current limiting devices 112 can cause undesired, and potentially unsafe, operation of current limiting system 110. In particular, while current limiting devices 112 are designed to have a common current limit value $I_{limit}$, current limit values $I_{limit}$ will typically be slightly different among current limiting devices 112 due to manufacturing variations. For example, current limit value $I_{limit}$(1) of current limiting device 112(1) will typically be slightly different from current limit value $I_{limit}$(2) of current limiting device 112(2) due to manufacturing variations between the two current limiting devices. A current limiting device 112 having a lowest current limit value $I_{limit}$ will activate first in response to an overcurrent condition, and it is possible that two or more current limiting devices 112 will activate simultaneously. As such, operation of current limiting system 110 is not deterministic, and in some cases, variation in current limit values $I_{limit}$ among current limiting devices 112 may cause one or more current limiting devices 112 to enter an undervoltage lockout state and temporarily shut down, resulting in oscillating behavior, or even failure, of current limiting system 110.

Figure 2:
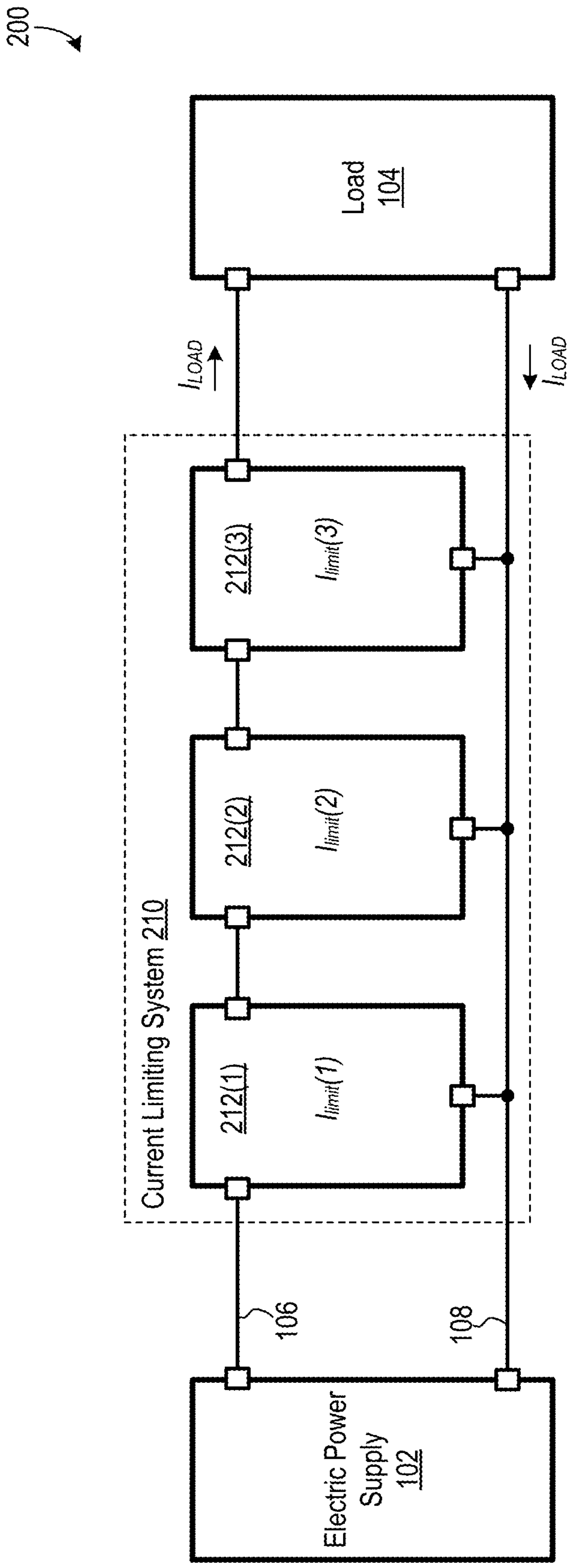
FIG. 2 is a schematic diagram of another electrical environment including a current limiting system.

FIG. 2 is a schematic diagram of an electrical environment 200, which is similar to electrical environment 100 of FIG. 1 but includes a current limiting system 210 in place of current limiting system 110. Current limiting system 210 differs from current limiting system 110 in that current limiting system 210 includes current limiting devices electrically coupled in series along forward power path 106 instead of along return power path 108. Specifically, current limiting system 210 includes three current limiting devices 212 electrically coupled in series along forward power path 106. Each current limiting device 212 is also electrically coupled to return power path 108. Each current limiting device 212 is configured to limit magnitude of electric current $I_{LOAD}$ flowing through forward power path 106 to a respective fixed current limit value $I_{limit}$ without assistance from any other current limiting device 212. Current limiting system 210 suffers from drawbacks similar to those discussed above with respect to current limiting system 110 of FIG. 1.

Disclosed herein are new current limiting systems and associated methods which at least partially overcome the drawbacks discussed above. The new current limiting systems include two or more current limiting devices electrically coupled in series to form a protected power path, where each current limiting device has a respective current limit value that is a function of a respective supply voltage of the current limiting device, instead of being a fixed value. For example, in particular embodiments, each current limiting device is configured such that its respective current limit value is decreased below a nominal value in response to the device's supply voltage falling below a threshold value. Such configuration advantageously causes the new current limiting systems to have a deterministic behavior, where a current limiting device closest to an output, e.g., to a protected interface, will dominate current limiting system behavior. Therefore, there is no danger of the oscillation discussed above with respect to FIG. 1. Additionally, particular embodiments of the new current limiting systems do not require components other than the above mentioned current limiting devices, which promotes low cost, small size, case of component procurement, and ease of manufacturing. Furthermore, certain embodiments do not require communication between the current limiting devices, thereby helping achieve true redundancy in current limiting circuitry, as well as case of system design, low cost, and small size. Moreover, in particular embodiments, each current limiting device of the current limiting system may have the same configuration, which further promotes low cost, case of component procurement, case of inventory management, and case of manufacturing.

Figure 3:
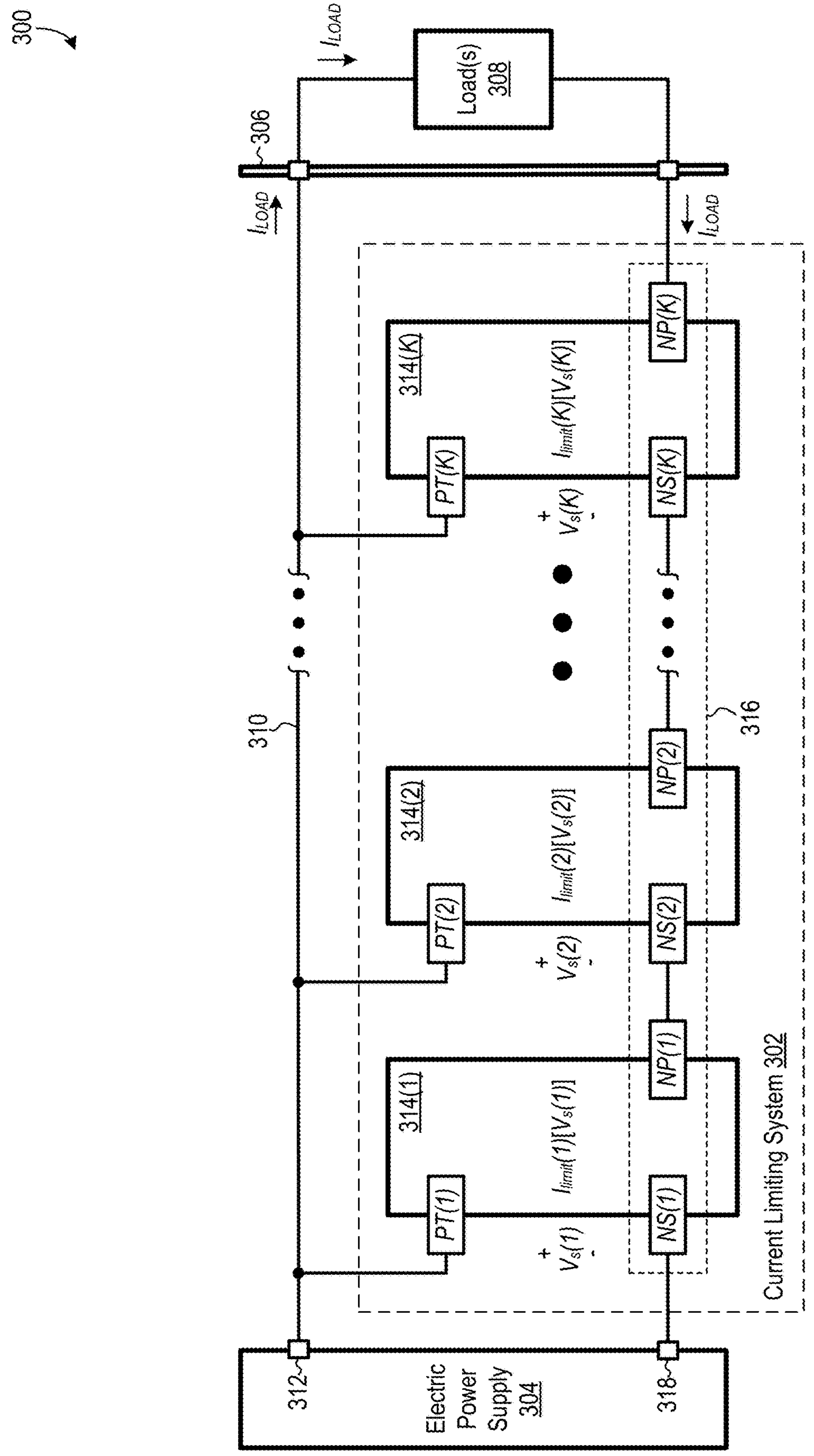
FIG. 3 is a schematic diagram of an electrical environment including a current limiting system with a plurality of current limiting devices, where a respective current limit current value of each current limiting device is a function of a respective supply voltage of the current limiting device, according to an embodiment.

FIG. 3 is a schematic diagram of an electrical environment 300 including a current limiting system 302, an electric power supply 304, a protected interface 306, one or more loads 308, and a forward power path 310, where current limiting system 302 is one embodiment of the new current limiting systems disclosed herein. Forward power path 310 electrically couples a positive node 312 of electric power supply 304 to protected interface 306. Additionally, current limiting system 302 includes K current limiting devices 314 electrically coupled in series to form a protected return power path 316, where K is an integer greater than one. Protected return power path 316 electrically couples a negative node 318 of electric power supply 304 to protected interface 306. Forward power path 310 and protected return power path 316 collectively provide a path for an electric current $I_{LOAD}$ to flow between electric power supply 304, protected interface 306, and load 308, as illustrated in FIG. 3.

As discussed below, current limiting system 302 limits magnitude of electric current $I_{LOAD}$ flowing through protected return power path 316, and the path is therefore deemed to be "protected." Current limiting system 302, though, does not directly control flow of electric current $I_{LOAD}$ through forward power path 310. However, current limiting system 302 may indirectly control electric current $I_{LOAD}$ through forward power path 310 by controlling flow of electric current $I_{LOAD}$ through protected return power path 316 because electric current $I_{LOAD}$ flowing through forward power path 310 must also flow through protected return power path 316, absent a fault in electrical environment 300. Protected interface 306 provides an interface for loads 308 to receive electric power from electric power supply 304 for powering loads 308. Protected interface 306 is deemed to be "protected" because current limiting system 302 limits magnitude of electric current flowing to loads 308 by limiting magnitude of current $I_{LOAD}$ flowing through protected return power path 316, as discussed below.

Each current limiting device 314 includes a respective positive power terminal PT, a respective negative supply terminal NS, and a respective negative protected terminal NP. Each positive power terminal PT is electrically coupled to forward power path 310 to enable its respective current limiting device 314 to be electrically powered from electric power supply 304. Each negative supply terminal NS is electrically coupled to the respective negative protected terminal NP of a preceding current limiting device 314 in current limiting system 302, except that negative supply terminal NS(1) of first current limiting device 314(1) is electrically coupled to negative node 318 of electric power supply 304. Each negative protected terminal NP is electrically coupled to the negative supply terminal NS of a subsequent current limiting device 314 in current limiting system 302, except that negative protected terminal NP (K) of the $K^{th}$(last) current limiting device 314 in current limiting system 302 is electrically coupled to protected interface 306.

Each negative supply terminal NS provides a respective negative power supply terminal for its respective current limiting device 314. Additionally, each current limiting device 314 is configured to limit the magnitude of electric current $I_{LOAD}$ flowing from its respective negative protected terminal NP to its respective negative supply terminal NS to a respective current limit value $I_{limit}$, or stated differently, to prevent magnitude of electric current $I_{LOAD}$ flowing from its respective negative protected terminal NP to its respective negative supply terminal NS from exceeding its respective current limit value $I_{limit}$, irrespective of operation of any other current limiting device 314. For example, current limiting device 314(1) is configured to limit magnitude of electric current $I_{LOAD}$ flowing from its negative protected terminal NP (1) to its negative supply terminal NS(1) to a current limit value $I_{limit}$(1), irrespective of operation of any other current limiting device 314 in current limiting system 302. As another example, current limiting device 314(2) is configured to limit magnitude of electric current $I_{LOAD}$ flowing from its negative protected terminal NP (2) to its negative supply terminal NS(2) to a current limit value $I_{limit}$(2), irrespective of operation of any other current limiting device 314 in current limiting system 302. As such, each current limiting device 314 limits magnitude of current $I_{LOAD}$ flowing through protected return power path 316 to its respective current limit value $I_{limit}$, and current limiting system 302 will therefore continue to function upon short circuiting of up to K−1 current limiting devices 314.

Importantly, the respective current limit value $I_{limit}$ of each current limiting device 314 is a function of a respective supply voltage $V_s$ of the current limiting device 314. For example, current limit value $I_{limit}$(1) of current limiting device 314(1) is a function of supply voltage $V_s$(1) of current limiting device 314(1). As another example, current limit value $I_{limit}$(2) of current limiting device 314(2) is a function of supply voltage $V_s$(2) of current limiting device 314(2). The respective supply voltage $V_s$ of each current limiting device 314 is a voltage between (i) a voltage of the respective positive power terminal PT of the current limiting device 314 and (ii) a voltage of protected return power path 316 at the respective negative supply terminal NS of the current limiting device 314. For example, supply voltage $V_s(1)$ of current limiting device 314(1) is a voltage between positive power terminal PT (1) and negative supply terminal NS(1). As another example, supply voltage $V_s(2)$ of current limiting device 314(2) is a voltage between positive power terminal PT (2) and negative supply terminal NS(2). There will be some voltage drop between the respective negative protected terminal NP and the respective negative supply terminal NS of a current limiting device 314 even when the current limiting device 314 is not operating in a state where it limits magnitude of current $I_{LOAD}$, due to the internal impedance of the current limiting device 314. Therefore, the respective supply voltage $V_s$ of each current limiting device 314 will be different from the respective supply voltage $V_s$ of each other current limiting device 314 when electric current $I_{LOAD}$ is flowing through protected return power path 316, with supply voltage $V_s(1)$ being the largest supply voltage and supply voltage $V_s(K)$ being the smallest supply voltage.

The respective current limit value $I_{limit}$ of each current limiting device 314 is a function of its respective supply voltage $V_s$ as follows. When the respective supply voltage $V_s$ of the current limiting device 314 is above a first voltage threshold value $V_{th\_1}$, the respective current limit value $I_{limit}$ is a respective constant value $I_c$. In contrast, when the respective supply voltage $V_s$ of the current limiting device 314 is below the first voltage threshold value $V_{th\_1}$, the respective current limit value $I_{limit}$ is less than the respective constant value Ir. The first voltage threshold value $V_{th\_1}$ is less than a minimum required operating voltage in electrical environment 300. For example, in certain embodiments, the first voltage threshold value is less than a minimum power supply voltage required by loads 308.

Figure 4:
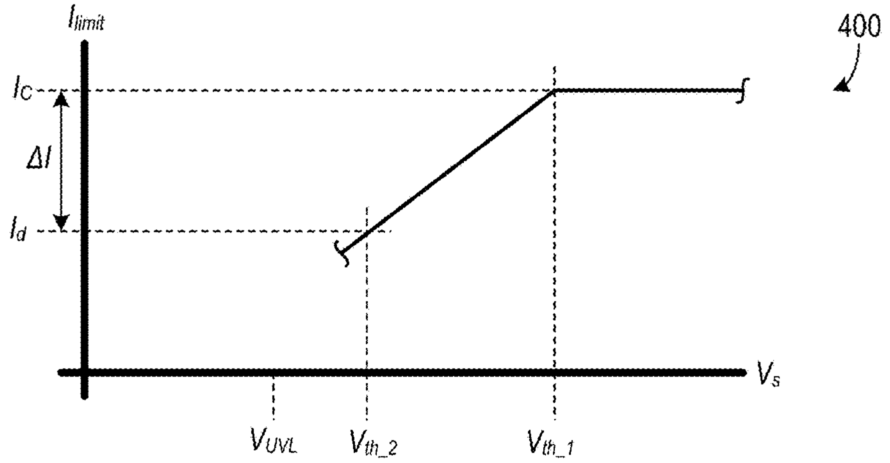
FIG. 4 is a graph illustrating an example of a linear relationship between a current limit value and a supply voltage.

FIG. 4 is a graph 400 of current limit value $I_{limit}$ versus supply voltage $V_s$ illustrating one example relationship between $I_{limit}$ and $V_s$ in each current limiting device 314. In the FIG. 4 example, current limit value $I_{limit}$ is a constant value $I_c$ when magnitude of supply voltage $V_s$ is at least a first voltage threshold value $V_{th\_1}$. In contrast, current limit value $I_{limit}$ decreases when magnitude of supply voltage $V_s$ is less than first voltage threshold value $V_{th\_1}$, such that current limit value $I_{limit}$ is $I_d$ when magnitude of supply voltage $V_s$ has fallen to a second voltage threshold value $V_{th\_2}$, where $V_{th\_2}$ is less than $V_{th\_1}$. Current limit value $I_d$ is less than current limit value $I_c$, and a difference between current limit value $I_d$ and current limit value $I_c$ is $\Delta I_c$. As discussed above, first voltage threshold value $V_{th\_1}$ is less than the minimum required operating voltage in electrical environment 300.

Current limit value $I_c$ may vary among current limiting devices 314 due to manufacturing variations. For example, current limit value $I_c(1)$ of current limiting device 314(1) is likely to be slightly different than current limit value $I_c(2)$ of current limiting device 314(2) due to manufacturing variations. If $I_c(1)$ is greater than $I_c(2)$, current limiting device 314(1) stays fully on during an overcurrent condition, while current limiting device 314(2) limits magnitude of current $I_{LOAD}$. However, if $I_c(1)$ is less than $I_c(2)$, current limiting device 314(1) will increase its impedance to limit magnitude of current $I_{LOAD}$, which will also reduce magnitude of supply voltage $V_s(2)$ of current limiting device 314(2). Magnitude of supply voltage $V_s(2)$ of current limiting device 314(2) will continue to decrease until supply voltage $V_s(2)$ of current limiting device 314(2) falls below first voltage threshold value $V_{th\_1}$, which causes current limiting device 314(2) to decrease $I_{limit}(2)$ below $I_c(2)$. In response thereto, current limiting device 314(2) begins to limit magnitude of current $I_{LOAD}$ in place of current limiting device 314(1). Consequently, magnitude of supply voltage $V_s(2)$ does not further decrease, thereby eliminating possibility of magnitude supply voltage $V_s(2)$ falling below an undervoltage lockout value of current limiting device 314(2) and associated shutdown of current limiting device 314(2).

The fact that $I_d$ is less than $I_c$ enables current limiting system 302 to compensate for variation in current limit value $I_c$ among current limiting devices 314. Specifically, as long as current limit value $I_d$ is less than the respective current limit value $I_c$ of each current limiting device 314, current limiting system 302 will realize the deterministic behavior discussed above, due to magnitude of supply voltage $V_s$ successively decreasing from the first current limiting device 314(1) to the $K_{th}$ current limiting device 314(K). Accordingly, in particular embodiments, current limit value $I_d$ is less than the respective current limit $I_c$, of each current limiting device 314. For example, assume that (a) K=4, (b) $I_c$ is nominally 1.00 amperes, (c) actual values of $I_c$ of current limiting devices 214(1)-214(4) are 1.03 amperes, 0.91 amperes, 0.97 amperes, and 1.06 amperes, respectively. In this example, $I_d$ should be less than 0.91 amperes, which is the smallest value of $I_c$ of the four current limiting devices 314, to realize deterministic behavior of current limiting system 302. Accordingly, the greater the potential variation in current limit value $I_c$ among current limiting devices 314, the smaller $I_d$ must be, and the greater $\Delta I$ must be, to realize deterministic behavior of current limiting system 302. On the flip side, the smaller the potential variation in current limit value $I_c$ among current limiting devices 314, the greater $I_d$ may be, and the smaller $\Delta I$ may be, while realizing deterministic behavior of current limiting system 302.

The value of current limit value $I_{limit}$ when supply voltage $V_s$ is below second voltage threshold value $V_{th\_2}$ is a design choice and is therefore not shown in FIG. 4. Current limit value $I_{limit}$ could be, for example, a constant value or a decreasing value, when supply voltage $V_s$ is below second voltage threshold value $V_{th\_2}$. FIG. 4 also depicts a value $V_{UVL}$ of supply voltage $V_s$, where value $V_{UVL}$ is an undervoltage lockout value of the current limiting device 314 that is lower than second voltage threshold value $V_{th\_2}$. Each current limiting device 314 shuts down when magnitude of its respective supply voltage $V_s$ is below its respective undervoltage lockout value $V_{UVL}$ to prevent potentially uncontrolled flow of electric current $I_{LOAD}$.

Considering current limiting system 302 as a whole, the total current limit is determined by the lowest $I_c$ value among all current limiting devices 314. Assuming in a given current limiting system 302 that the Jth current limiting device 314 has the lowest current limiting value $I_c(J)$, then all current limiting devices 314(1), 314(2), . . . , 314(J−1) will not activate their current limiting function and stay full on. Therefore, the supply voltage $V_s(J)$ has minimum voltage drop from the input voltage port, and $V_s(J)>V_{th\_1}$. As mentioned previously, the first voltage threshold value $V_{th\_1}$ is less than a minimum required operating voltage in electrical environment 300. Hence, as long as the system input voltage stays above $V_{th\_1}$, the system current limit is determined by $I_{limit}(J)=I_c(J)$, which stays constant, regardless of the variation of the supply voltage. The characteristics of electric power available at protected interface 306 from a perspective of loads 308 stays constant.

Figure 5:
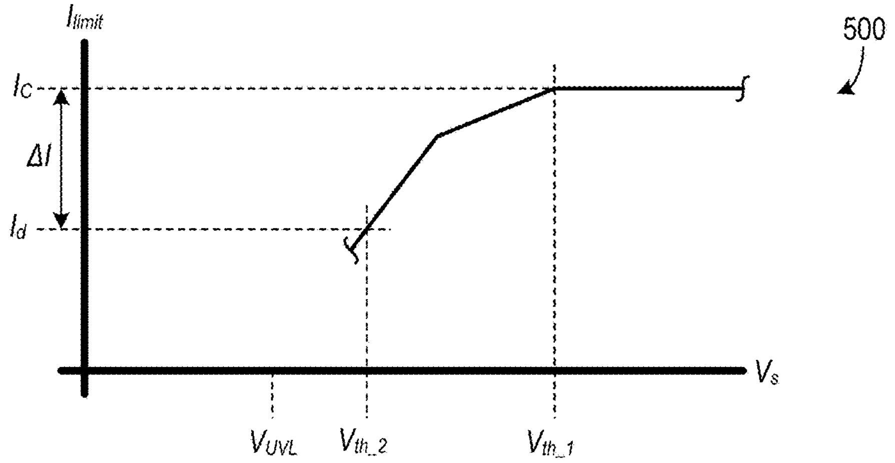
FIG. 5 is a graph illustrating an example of a piecewise linear relationship between a current limit value and a supply voltage.
Figure 6:
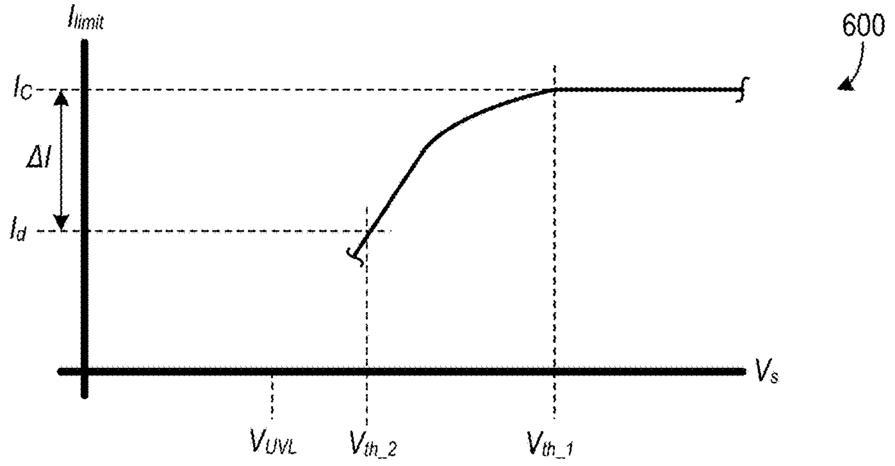
FIG. 6 is a graph illustrating an example of a non-linear relationship between a current limit value and a supply voltage.

FIG. 4 illustrates current limit value $I_{limit}$ linearly decreasing with magnitude of supply voltage $V_s$ when magnitude of supply voltage $V_s$ decreases from first voltage threshold value $V_{th\_1}$ to second voltage threshold value $V_{th\_2}$. However, current limiting devices 314 may be configured to have a different relationship between current limit value $I_{limit}$ and magnitude of supply voltage $V_s$ when magnitude of supply voltage $V_s$ is between first voltage threshold value $V_{th\_1}$ and second voltage threshold value $V_{th\_2}$, as long as current limit value $I_{limit}$ monotonically decreases from first voltage threshold value $V_{th\_1}$ to second voltage threshold value $V_{th\_2}$. For example, FIG. 5 is a graph 500 of current limit value $I_{limit}$ versus supply voltage $V_s$ illustrating another example relationship between current limit value $I_{limit}$ and supply voltage $V_s$ in each current limiting device 314. Graph 500 is similar to graph 400 of FIG. 4 except that current limit value $I_{limit}$ has a piecewise linear relationship to supply voltage $V_s$ when magnitude of supply voltage $V_s$ is between first voltage threshold value $V_{th\_1}$ and second voltage threshold value $V_{th\_2}$. As another example, FIG. 6 is a graph 600 of current limit value $I_{limit}$ versus supply voltage $V_s$ illustrating an additional example relationship between current limit value $I_{limit}$ and supply voltage $V_s$ in each current limiting device 314. Graph 600 is similar to graph 400 of FIG. 4 except that current limit value $I_{limit}$ has a nonlinear, but monotonic, relationship to supply voltage $V_s$ when magnitude of supply voltage $V_s$ is between first voltage threshold value $V_{th\_1}$ and second voltage threshold value $V_{th\_2}$.

Figure 7:
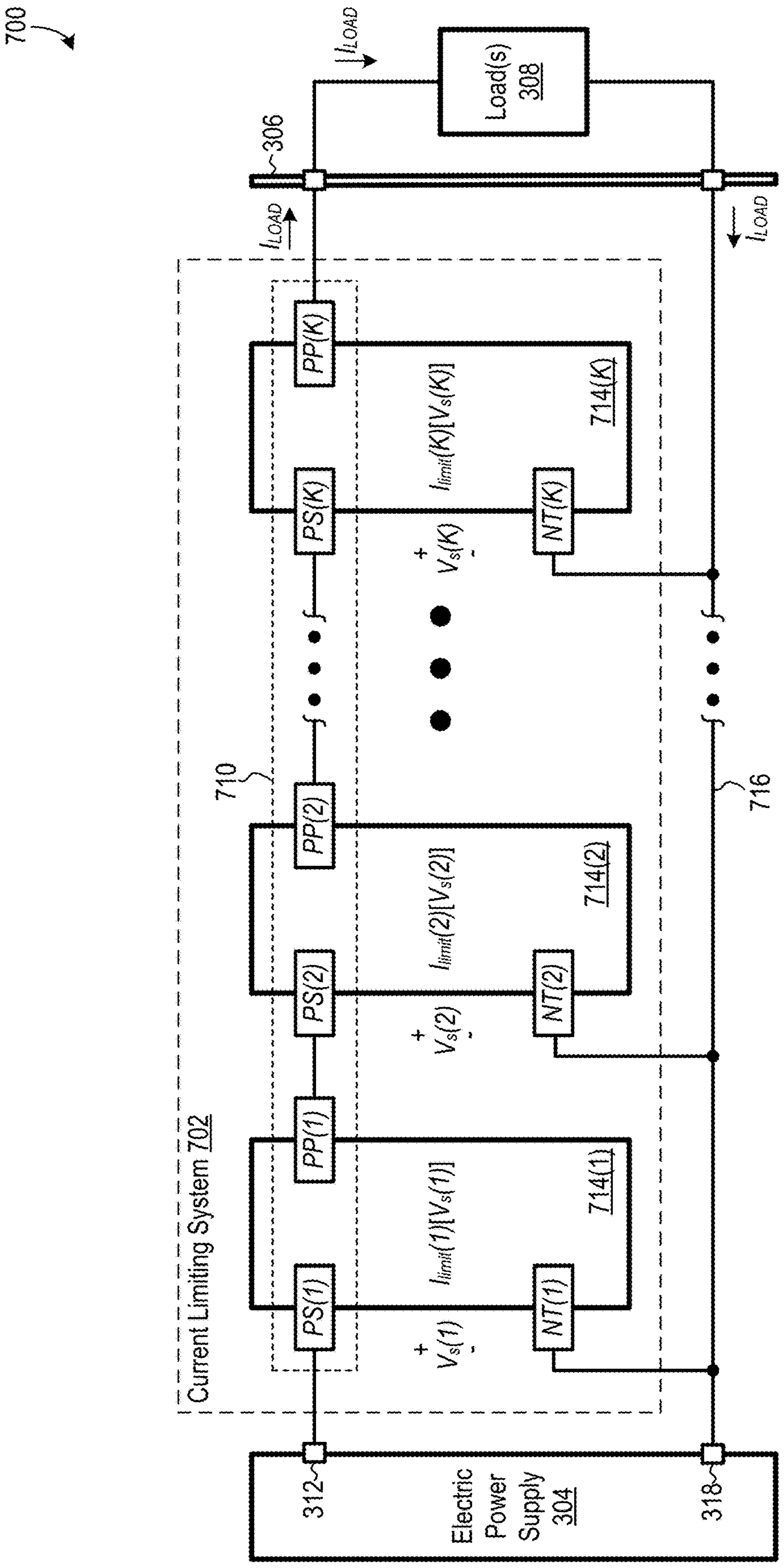
FIG. 7 is a schematic diagram of an electrical environment including an alternate embodiment of the FIG. 3 current limiting system configured to limit magnitude of current flowing through a forward power path instead of limiting magnitude of current flowing through a return power path.

Referring again to FIG. 3, current limiting system 302 could be modified to form a protected forward power path, instead of a protected return power path. For example, FIG. 7 is a schematic diagram of an electrical environment 700 which is an alternate embodiment of electrical environment 300 where (i) current limiting system 302 is replaced with a current limiting system 702, (ii) protected return power path 316 is replaced with a return power path 716, and (iii) forward power path 310 is replaced with a protected forward power path 710. Current limiting system 702 is similar to current limiting system 302, except that current limiting system 702 is configured to limit magnitude of current $I_{LOAD}$ flowing through a forward power path, i.e., protected forward power path 710, instead of a return power path. Current limiting system 702 includes K current limiting devices 714 electrically coupled in series to form protected forward power path 710, where K again is an integer greater than one. Protected forward power path 710 electrically couples positive node 312 of electric power supply 304 to protected interface 306, and return power path 716 electrically couples negative node 318 of electric power supply 304 to protected interface 306. Protected forward power path 710 and return power path 716 collectively provide a path for an electric current $I_{LOAD}$ to flow between electric power supply 304, protected interface 306, and loads 308, as illustrated in FIG. 7.

Each current limiting device 714 includes a respective positive supply terminal PS, a respective negative power terminal NT, and a respective positive protected terminal PP. Each negative power terminal NT is electrically coupled to return power path 716 to enable its respective current limiting device 714 to be electrically referenced to negative node 318 of electric power supply 304. Each positive supply terminal PS is electrically coupled to the respective positive protected terminal PP of a preceding current limiting device 714 in current limiting system 702, except that positive supply terminal PS(1) of first current limiting device 714(1) is electrically coupled to positive node 312 of electric power supply 304. Each positive protected terminal PP is electrically coupled to the positive supply terminal PS of a subsequent current limiting device 714 in current limiting system 702, except that positive protected terminal PP(K) of the $K^{th}$ (last) current limiting device 714 in current limiting system 702 is electrically coupled to protected interface 706.

Each positive supply terminal PS provides a respective positive power supply terminal for its respective current limiting device 714. Additionally, each current limiting device 714 is configured to limit the magnitude of electric current $I_{LOAD}$ flowing from its respective positive supply terminal PS to its respective positive protected terminal PP to a respective current limit value $I_{limit}$, or stated differently, to prevent magnitude of electric current $I_{LOAD}$ flowing from its respective positive supply terminal PS to its respective positive protected terminal PS from exceeding its respective current limit value $I_{limit}$, irrespective of operation of any other current limiting device 714. For example, current limiting device 714(1) is configured to limit magnitude of electric current $I_{LOAD}$ flowing from its positive supply terminal PS(1) to its positive protected terminal PP(1) to a current limit value $I_{limit}$(1), irrespective of operation of any other current limiting device 714 in current limiting system 702. As another example, current limiting device 714(2) is configured to limit magnitude of electric current $I_{LOAD}$ flowing from its positive supply terminal PP(2) to its positive protected terminal PP(2) to a current limit value $I_{limit}$(2), irrespective of operation of any other current limiting device 714 in current limiting system 702. As such, each current limiting device 714 limits magnitude of current $I_{LOAD}$ flowing through protected forward power path 710 to its respective current limit value $I_{limit}$, and current limiting system 702 will therefore continue to function upon short circuiting of up to K−1 current limiting devices 714.

Similar to current limiting devices 314 of FIG. 3, the respective current limit value $I_{limit}$ of each current limiting device 714 is a function of a respective supply voltage $V_s$ of the current limiting device 714. For example, current limit value $I_{limit}$(1) of current limiting device 714(1) is a function of supply voltage $V_s$(1) of current limiting deice 714(1). As another example, current limit value $I_{limit}$(2) of current limiting device 714(2) is a function of supply voltage $V_s$(2) of current limiting device 714(2). The respective supply voltage $V_s$ of each current limiting device 314 is a voltage between (i) a voltage of protected forward power path 710 at a respective positive supply terminal PS of the current limiting device 714 and (ii) a voltage of a respective negative power terminal NT of the current limiting device 714. For example, supply voltage $V_s$(1) of current limiting device 714(1) is a voltage between positive supply terminal PS(1) and negative power terminal NT(1). As another example, supply voltage $V_s$(2) of current limiting device 714(2) is a voltage between positive supply terminal PS(2) and negative power terminal NT(2). There will be some voltage drop between the respective power supply terminal PS and the respective positive protected terminal PP of a current limiting device 714 even when the current limiting device 714 is not operating in a state where it limits magnitude of current $I_{LOAD}$, due to the internal impedance of the current limiting device 714. Therefore, the respective supply voltage $V_s$ of each current limiting device 714 will be different from the respective supply voltage $V_s$ of each other current limiting device 714 when electric current $I_{LOAD}$ is flowing through protected forward power path 710, with supply voltage $V_s$(1) being the largest supply voltage and supply voltage $V_s$(K) being the smallest supply voltage.

The respective current limit value $I_{limit}$ of each current limiting device 714 is a function of its respective supply voltage $V_s$ as follows. When the respective supply voltage $V_s$ of the current limiting device 714 is above a first voltage threshold value, the respective current limit value $I_{limit}$ is a respective constant value. In contrast, when the respective supply voltage $V_s$ of the current limiting device 714 is below the first voltage threshold value, the respective current limit value $I_{limit}$ is less than the respective constant value. For example, each current limiting device 714 may have a relationship between its respective current limit value $I_{limit}$ and its respective supply voltage $V_s$ similar to that discussed above with respect to FIG. 4, 5, or 6, where current limit value $I_d$ is less than the respective current limit $I_c$ of each current limiting device 714, to realize deterministic behavior of current limiting system 702. In a manner analogous to that discussed above with respect to electrical environment 300, the first voltage threshold value of current limiting devices 714 is less than a minimum required operating voltage in electrical environment 700.

Figure 8:
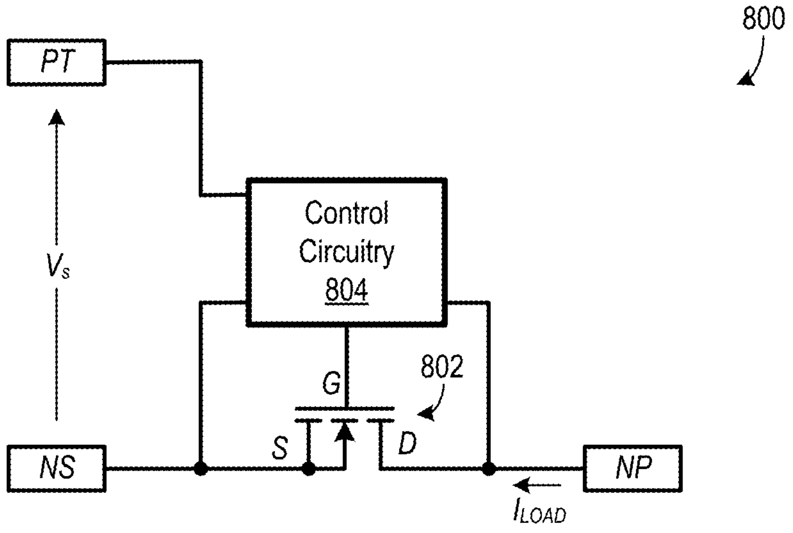
FIG. 8 is a schematic diagram of one possible embodiment of an instance of the current limiting devices of FIG. 3.
Figure 9:
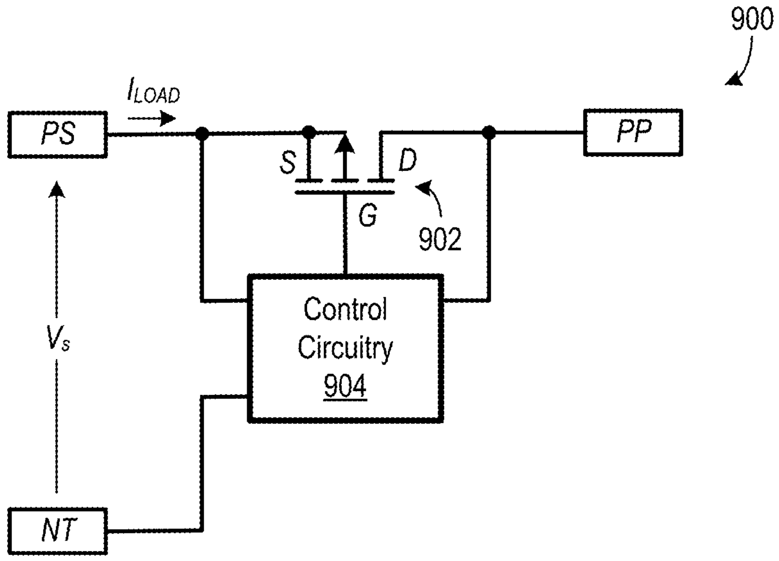
FIG. 9 is a schematic diagram of one possible embodiment of an instance of the current limiting devices of FIG. 7.

Discussed below with respect to FIGS. 8 and 9 are a couple of example embodiments of the new current limiting devices disclosed herein. However, it is understood that the new current limiting devices are not limited to the example embodiments of FIGS. 8 and 9. Instead, the new current limiting devices can essentially be embodied in any manner as long as they function as discussed above.

FIG. 8 is a schematic diagram of a current limiting device 800, where current limiting device 800 is one possible embodiment of a current limiting device 314(FIG. 3) instance. Current limiting device 800 includes an enhancement mode, N-channel metal oxide semiconductor field effect transistor (NMOS FET) 802, control circuitry 804, a positive power terminal PT, a negative supply terminal NS, and a negative protected terminal NP. NMOS FET 802 includes a gate G, a drain D, and a source S. Drain D is electrically coupled to negative protected terminal NP, source S is electrically coupled to negative supply terminal NS, and gate G is electrically coupled to control circuitry 804. Control circuitry 804 is electrically coupled to positive power terminal PT, negative supply terminal NS, negative protected terminal NP, and gate G. Control circuitry 804 includes analog and/or digital electronic circuitry (not shown), and control circuitry 804 is electrically powered from a supply voltage $V_s$ between positive power terminal PT and negative supply terminal NS.

Control circuitry 804 is configured to sense each of (i) magnitude of electric current $I_{LOAD}$ flowing from negative protected terminal NP to negative supply terminal NS and (ii) magnitude of supply voltage $V_s$. Control circuitry 804 is additionally configured to modulate a gate-to-source voltage of NMOS FET 802 to control NMOS FET 802 as a function of electric current $I_{LOAD}$ and $V_s$ as follows. When magnitude of electric current $I_{LOAD}$ is below a current limit value $I_{limit}$ of current limiting device 800, control circuitry 804 causes NMOS FET 802 to operate in its fully on-state, such that NMOS FET 802 does not limit magnitude of electric current $I_{LOAD}$, and drain-to-source voltage drop across NMOS FET 802 is minimized. On the other hand, when magnitude of electric current $I_{LOAD}$ rises to the current limit value $I_{limit}$ of current limiting device 800, control circuitry 804 controls NMOS FET 802 such that NMOS FET 802 has a drain-to-source on-resistance that prevents magnitude of electric current $I_{LOAD}$ from exceeding current limit value $I_{limit}$ of current limiting device 800, thereby limiting magnitude of electric current $I_{LOAD}$.

Furthermore, control circuitry 804 is configured to control the current limit value $I_{limit}$ of current limiting device 800 as a function of supply voltage $V_s$. Specifically, when supply voltage $V_s$ is above a first voltage threshold value, the current limit value $I_{limit}$ of current limiting device 800 is a constant value. In contrast, when the supply voltage $V_s$ is below the first voltage threshold value, the current limit value $I_{limit}$ of current limiting device 800 is less than the respective constant value. For example, in certain embodiments, control circuitry 804 is configured to control the current limit value $I_{limit}$ of current limiting device 800 as a function of supply voltage $V_s$ such that the current limit value $I_{limit}$ has a relationship to supply voltage $V_s$ as illustrated in one of FIG. 4, 5, or 6, discussed above. Moreover, control circuitry 804 is configured to cause NMOS FET 802 to operate in its off-state, to prevent flow of electric current $I_{LOAD}$, when supply voltage $V_s$ falls below an undervoltage lockout value of the current limiting device 800, such as value $V_{UVL}$ of one of FIG. 4, 5, or 6, discussed above. NMOS FET 802 could be replaced with another type of transistor, such as another type of field effect transistor or a bipolar junction transistor (BJT), with appropriate changes to control circuitry 804.

FIG. 9 is a schematic diagram of a current limiting device 900, where current limiting device 900 is one possible embodiment of a current limiting device 714 (FIG. 7) instance. Current limiting device 900 includes an enhancement mode, P-channel metal oxide semiconductor field effect transistor (PMOS FET) 902, control circuitry 904, a positive supply terminal PS, a negative power terminal NT, and a positive protected terminal PP. PMOS FET 902 includes a gate G, a drain D, and a source S. Drain D is electrically coupled to positive protected terminal PP, source S is electrically coupled to positive supply terminal PS, and gate G is electrically coupled to control circuitry 904. Control circuitry 904 is electrically coupled to positive protected terminal PT, positive supply terminal PS, negative power terminal NT, and gate G. Control circuitry 904 includes analog and/or digital electronic circuitry (not shown), and control circuitry 904 is electrically powered from a supply voltage $V_s$ between positive supply terminal PS and negative power terminal NT.

Control circuitry 904 is configured to sense each of (i) magnitude of electric current $I_{LOAD}$ flowing from positive supply terminal PS to positive protected terminal PP and (ii) magnitude of supply voltage $V_s$. Control circuitry 904 is additionally configured to modulate a source-to-gate voltage of PMOS FET 902 to control PMOS FET 902 as a function of electric current $I_{LOAD}$ and $V_s$ as follows. When magnitude of electric current $I_{LOAD}$ is below a current limit value $I_{limit}$ of current limiting device 900, control circuitry 904 causes PMOS FET 902 to operate in its fully on-state, such that PMOS FET 902 does not limit magnitude of electric current $I_{LOAD}$, and source-to-drain voltage drop across PMOS FET 902 is minimized. On the other hand, when magnitude of electric current $I_{LOAD}$ rises to the current limit value $I_{limit}$ of current limiting device 900, control circuitry 904 controls PMOS FET 902 such that PMOS FET 902 has a source-to-drain on-resistance that prevents magnitude of electric current $I_{LOAD}$ from exceeding current limit value $I_{limit}$ of current limiting device 900, thereby limiting magnitude of electric current $I_{LOAD}$.

Furthermore, control circuitry 904 is configured to control the current limit value $I_{limit}$ of current limiting device 900 as a function of supply voltage $V_s$. Specifically, when supply voltage $V_s$ is above a first voltage threshold value, the current limit value $I_{limit}$ of current limiting device 900 is a constant value. In contrast, when the supply voltage $V_s$ is below the first voltage threshold value, the current limit value $I_{limit}$ of current limiting device 900 is less than the respective constant value. For example, in certain embodiments, control circuitry 904 is configured to control the current limit value $I_{limit}$ of current limiting device 900 as a function of supply voltage $V_s$ such that the current limit value $I_{limit}$ has a relationship to supply voltage $V_s$ as illustrated in one of FIG. 4, 5, or 6, discussed above. Moreover, control circuitry 904 is configured to cause PMOS FET 902 to operate in its off-state, to prevent flow of electric current $I_{LOAD}$, when supply voltage $V_s$ falls below an undervoltage lockout value of the current limiting device 900, such as value $V_{UVL}$ of one of FIG. 4, 5, or 6, discussed above. PMOS FET 902 could be replaced with another type of transistor, such as another type of field effect transistor or a BJT, with appropriate changes to control circuitry 904.

Figure 10:
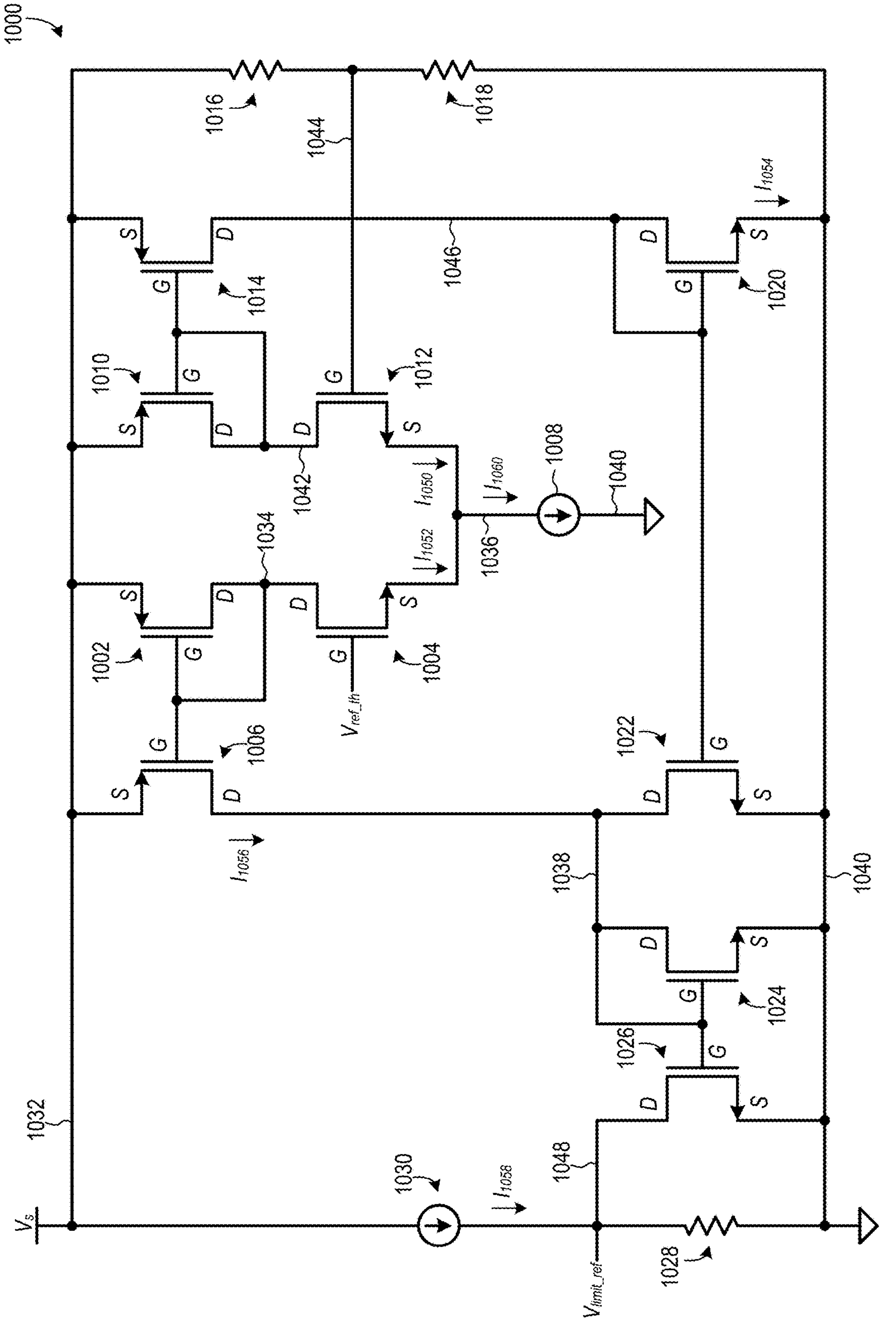
FIG. 10 is a schematic diagram of a foldback circuit for generating a reference voltage representing a current limit value, according to an embodiment.

FIG. 10 is a schematic diagram of a foldback circuit 1000, which is used in certain embodiments of control circuitry 804 (FIG. 8) and control circuitry 904 (FIG. 9) to generate a reference voltage $V_{limit\_ref}$ representing current limit value $I_{limit}$. Given a current sensor gain $G_{SNS}$, $I_{limit}=V_{limit\_ref}*G_{SNS}$. As discussed below, $V_{limit\_ref}$ is constant when supply voltage $V_s$ is greater than or equal to a first voltage threshold value $V_{th\_1}$, and $V_{limit\_ref}$ decreases with decreasing value of supply voltage $V_s$ when supply voltage $V_s$ is below first voltage threshold value $V_{th\_1}$.

Foldback circuit 1000 includes a PMOS FET 1002, an NMOS FET 1004, a PMOS FET 1006, a current source 1008, a PMOS FET 1010, an NMOS FET 1012, a PMOS FET 1014, a resistor 1016, a resistor 1018, an NMOS FET 1020, an NMOS FET 1022, an NMOS FET 1024, an NMOS FET 1026, a resistor 1028, and a current source 1030. A source S of PMOS FET 1002 is electrically coupled to a power rail 1032, and each of a drain D and a gate G of PMOS FET 1002 are electrically coupled to a node 1034. A drain D of NMOS FET 1004 is electrically coupled to node 1034, and source S of NMOS FET 1004 is electrically coupled to a node 1036. A gate G of NMOS FET 1004 is connected to a voltage reference $V_{ref\_th}$. A source S of PMOS FET 1006 is electrically coupled to power rail 1032, and a drain D of PMOS FET 1006 is electrically coupled to a node 1038. A gate G of PMOS FET 1006 is electrically coupled to node 1034. Current source 1008 is electrically coupled between node 1036 and a reference node 1040.

A source S of PMOS FET 1010 is electrically coupled to power rail 1032, and each of a drain D and gate G of PMOS FET 1010 are electrically coupled to a node 1042. A drain D of NMOS FET 1012 is electrically coupled to node 1042, and a source S of NMOS FET 1012 is electrically coupled to node 1036. A gate G of NMOS FET 1012 is electrically coupled to a node 1044. A source S of PMOS FET 1014 is electrically coupled to power rail 1032, and a drain D of PMOS FET 1014 is electrically coupled to a node 1046. A gate G of PMOS FET 1014 is electrically coupled to node 1042. Resistor 1016 is electrically coupled between power rail 1032 and node 1044, and resistor 1018 is electrically coupled between node 1044 and reference node 1040. A source S of NMOS FET 1020 is electrically coupled to reference node 1040, and each of a drain D and gate G of NMOS FET 1020 are electrically coupled to node 1046.

A drain D of NMOS FET 1022 is electrically coupled to node 1038, and a source S of NMOS FET 1022 is electrically coupled to reference node 1040. A gate G of NMOS FET 1022 is electrically coupled to node 1046. Each of a drain D and a gate G of NMOS FET 1024 are electrically coupled to node 1038, and a source S of NMOS FET 1024 is electrically coupled to reference node 1040. A drain D of NMOS FET 1026 is electrically coupled to a node 1048, and a source S of NMOS FET 1026 is electrically coupled to reference node 1040. A gate G of NMOS FET 1026 is electrically coupled to node 1038. Resistor 1028 is electrically coupled between node 1048 and reference node 1040, and current source 1030 is electrically coupled between power rail 1032 and node 1048.

Magnitude of voltage reference $V_{ref\_th}$ is set according to EQN. 1 below, where $R_{1018}$ is resistance of resistor 1018 and $R_{1016}$ is resistance of resistor 1016. Voltage on power rail 1032 is equal to supply voltage $V_s$. When magnitude of supply voltage $V_s$ is greater than voltage threshold value $V_{th\_1}$, magnitude of current $I_{1050}$ flowing through NMOS FET 1012 is greater than magnitude of current $I_{1052}$ flowing through NMOS FET 1004, and magnitude of current $I_{1054}$ flowing through NMOS FET 1020 is greater than magnitude of current $I_{1056}$ flowing through PMOS FET 1006. Consequently, each NMOS FET 1024 and NMOS FET 1026 is in its off-state, and voltage $V_{limit\_ref}$ at node 1048 is therefore a constant value equal to the product of current $I_{1058}$ flowing through current source 1030 and resistance $R_{1028}$ of resistor 1028. The constant value of voltage $V_{limit\_ref}$ represents, for example, value $I_c$ of current limit value $I_{limit}$ in FIG. 4, where $I_c=I_{1058}*R_{1028}*G_{SNS}$.

$$V_{ref\_th} = V_{th\_1} \cdot \frac{R_{1018}}{R_{1018} + R_{1016}} \quad \text{(EQN. 1)}$$

On the other hand, when magnitude of supply voltage $V_s$ is less than voltage threshold value $V_{th\_1}$, magnitude of current $I_{1050}$ is less than magnitude of current $I_{1052}$ such that each of NMOS FET 1024 and NMOS FET 1026 operates in its on-state, thereby reducing magnitude of voltage $V_{limit\_ref}$ by $\Delta V_{limit\_ref}$. $\Delta V_{limit\_ref}$ is governed according to EQN. 2 below, where $g_{m1004}$ is transconductance of NMOS FET 1004, and $\Delta V_s$ is change in supply voltage $V_s$. A maximum value of $\Delta V_{limit\_ref}$ is constrained by EQN. 3 below, where $I_{1060}$ is magnitude of current flowing through current source 1008. Some alternate embodiments of foldback circuit 1000 are configured to degenerate NMOS FET 1004 and NMOS FET 1012 to stabilize their transconductance.

$$\Delta V_{limit\_ref} = \Delta V_s \cdot g_{m1004} \cdot \frac{R_{1018} \cdot R_{1028}}{(R_{1018} + R_{1016})} \quad \text{(EQN. 2)}$$

$$\Delta V_{limit\_ref} \le I_{1060} \cdot R_{1028} \quad \text{(EQN. 3)}$$

To guarantee that the monotonically decreasing $I_{limit}$ can reach $I_d$ or below, the choice of current 1060 and resistor 1028 is constrained according to EQN. 4 below. Additionally, to guarantee a minimum decreasing slope so that $V_{th\_2}>V_{UVL}$, the choice of $g_{m1004}$ is constraint by EQN. 5, assuming that the transconductance of an input stage implemented by NMOS FETs 1004 and 1012 stays constant.

$$I_{1060} \cdot R_{1028} \cdot G_{SNS} > I_c - I_d \quad \text{(EQN. 4)}$$

$$g_{m1004} = \frac{I_c - I_d}{G_{SNS}(V_{th1} - V_{th2})\frac{R_{1018} \cdot R_{1028}}{(R_{1018} + R_{1016})}} > \frac{I_c - I_d}{G_{SNS}(V_{th1} - V_{UVL})\frac{R_{1018} \cdot R_{1028}}{(R_{1018} + R_{1016})}} \quad \text{(EQN. 5)}$$

Figure 11A:
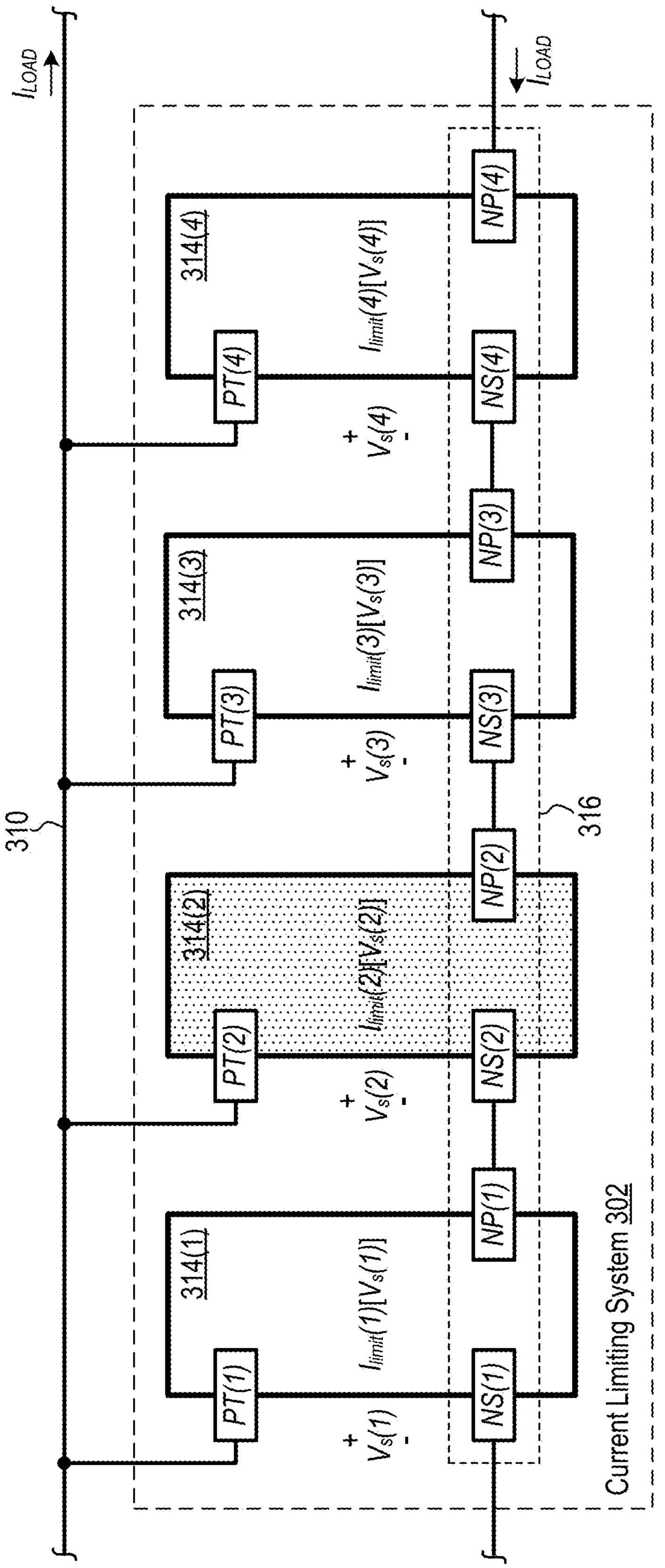
FIG. 11A, FIG. 11B, and FIG. 11C collectively illustrate one example of operation of an embodiment of the FIG. 3 current limiting system.
Figure 11B:
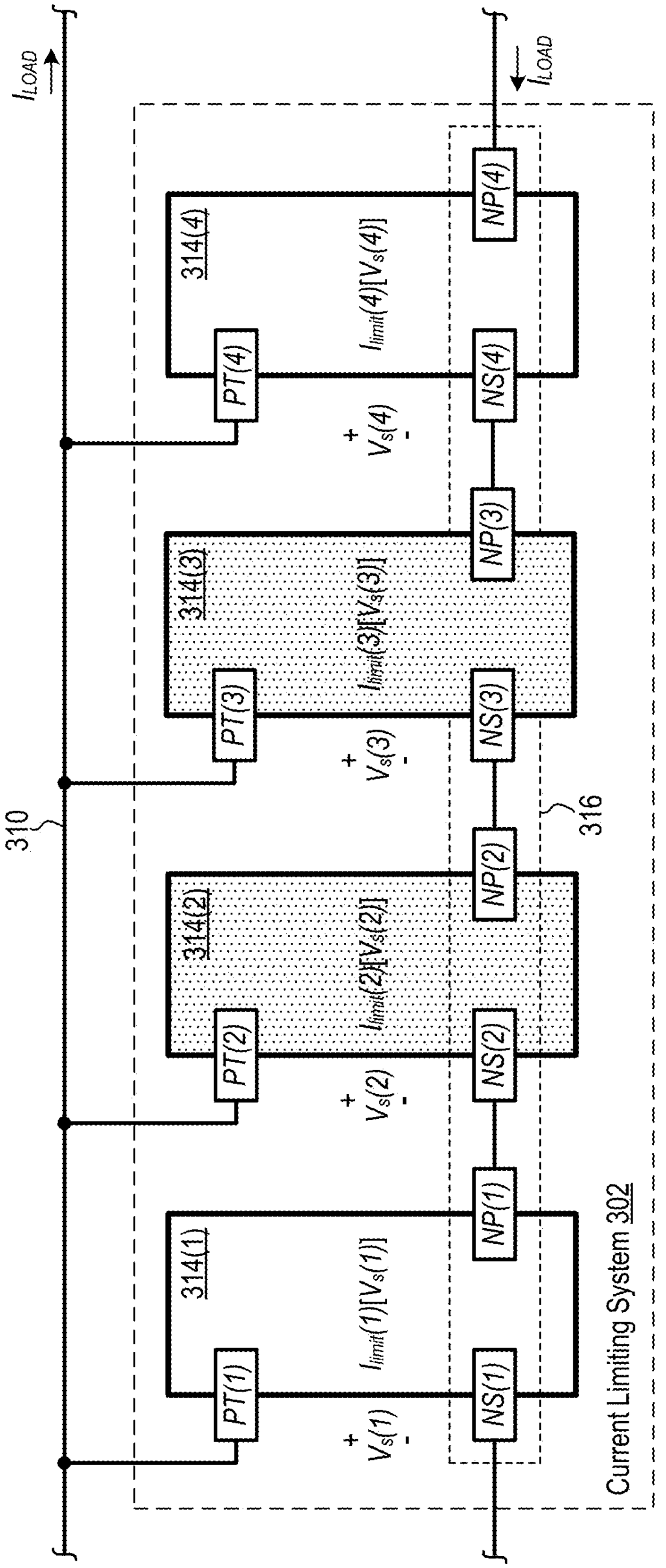
Figure 11C:
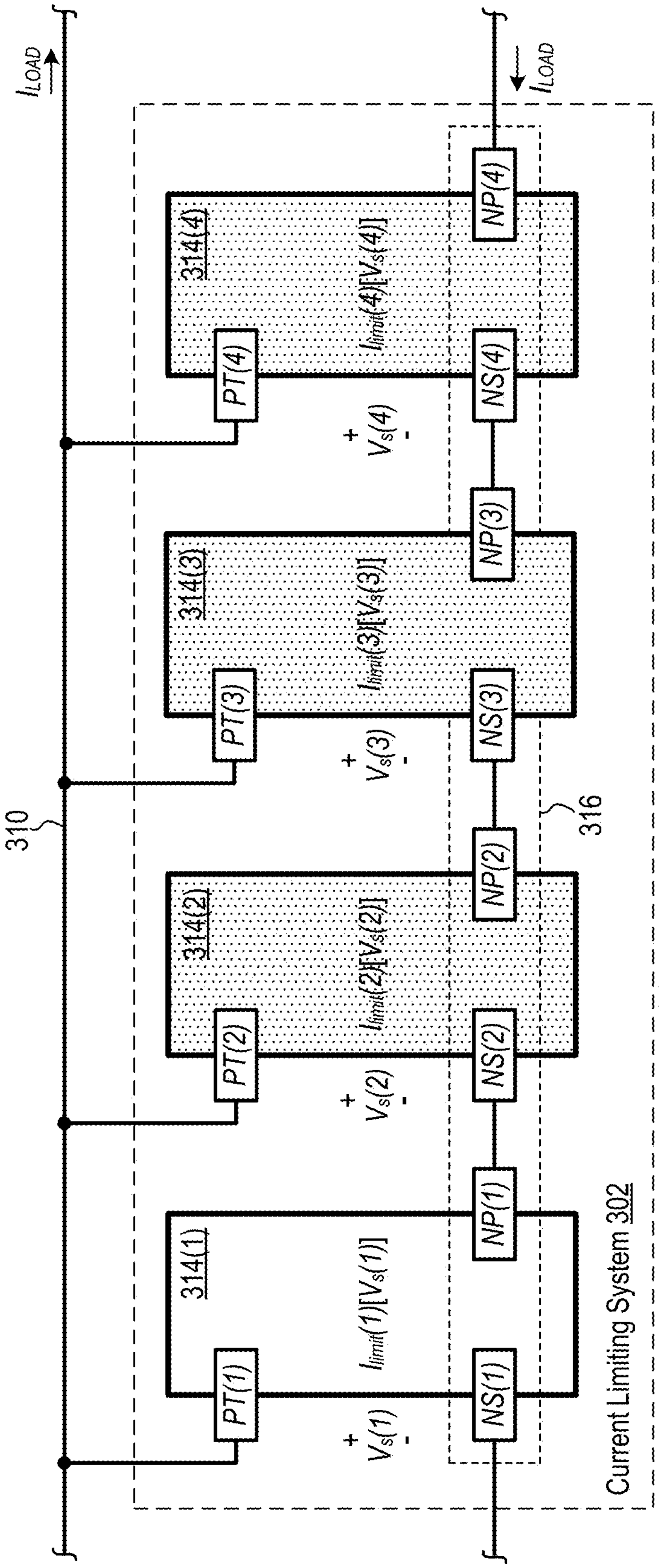

FIGS. 11A-11C collectively illustrate one example of operation of an embodiment of current limiting system 302 where K=4 and each current limiting device 314 has a respective relationship between current limit value $I_{limit}$ and supply voltage $V_s$ as illustrated in FIG. 4. It is understood, though, that current limiting system 302 is not limited to operating according to the example of FIGS. 11A-11C. Electric power supply 304, protected interface 306, and loads 308 are not shown in FIGS. 11A-11C for illustrative clarity.

Referring to FIG. 11A, assume that (i) current limiting device 314(2) has a smallest current limit value $I_C$ of all current limiting devices 314 of the example of FIGS. 11A-11C and (ii) magnitude of electric current $I_{LOAD}$ rises to current limit value $I_C$ of current limiting device 314(2). Current limiting device 314(2) will therefore limit magnitude of electric current $I_{LOAD}$, as symbolically shown in FIG. 11A by shading of current limiting device 314(2). Consequently, magnitude of supply voltage $V_s$(3) of current limiting device 314(3) and supply voltage $V_s$(4) of current limiting device 314(4) will each decrease, with magnitude of supply voltage $V_s$(4) being smaller than magnitude of supply voltage $V_s$(3) due to impedance of current limiting device 314(3). Current limiting device 314(3) will decrease its current limit value $I_{limit}$(3) in response to the decrease in its supply voltage $V_s$(3), which will cause current limiting device 314(3) to also begin limiting magnitude of electric current $I_{LOAD}$, as illustrated in FIG. 11B by shading of current limiting device 314(3).

Primary control of current limiting system 302 will shift from current limiting device 314(2) to current limiting device 314(3) in response to current limiting device 314(3) beginning to limit magnitude of electric current $I_{LOAD}$, which will further decrease supply voltage $V_s$(4) of current limiting device 314(3). In response, current limiting device 314(4) will decrease its current limit value $I_{limit}$(4), which will cause current limiting device 314(4) to also begin limiting magnitude of electric current $I_{LOAD}$, as illustrated in FIG. 11C by shading of current limiting device 314(4). Consequently, magnitude of supply voltage $V_s$(4) will stop decreasing, and current limiting system 302 will reach a steady state condition where (i) current limiting device 314(4) dominates behavior of current limiting system 302 and (ii) $V_s(4)<V_s(3)<V_s(2)<V_s(1)$. It should be noted that the respective supply voltage $V_s$ of each current limiting device 314 remains above its undervoltage lockout value in this steady state condition, thereby preventing shutdown of any current limiting device 314 and associated oscillation of current limiting system 302. Furthermore, the above-mentioned changes in current limit values $I_{limit}$ will not be noticeable outside of current limiting system 302, e.g., the changes in current limit values $I_{limit}$ will not change characteristics of electric power available at protected interface 306 from a perspective of loads 308.

Combinations of Features

Features described above may be combined in various ways without departing from the scope hereof. The following examples illustrate some possible combinations.

(A1) A current limiting system includes a plurality of current limiting devices electrically coupled in series to form a protected return power path where each current limiting device is configured to individually limit magnitude of an electric current flowing through the protected return power path to a respective current limit value of the current limiting device. Each current limiting device is further configured to control its respective current limit value such that (a) the respective current limit value of the current limiting device is a respective constant current value when a magnitude of a respective supply voltage of the current limiting device is above a first voltage threshold value, the respective supply voltage of the current limiting device being a voltage between (i) a voltage of a respective positive power terminal of the current limiting device and (ii) a voltage of the protected return power path at a respective negative supply terminal of the current limiting device, and (b) the respective current limit value of the current limiting device is less than the respective constant current value of the current limiting device when the magnitude of the respective supply voltage of the current limiting device is below the first voltage threshold value.

(A2) In the current limiting system denoted as (A1), each current limiting device may be further configured to control its respective current limit value such that its respective current limit value is less than the respective constant current value of each current limiting device of the plurality of current limiting devices, when the respective supply voltage of the current limiting device is at a second voltage threshold value that is lower than the first voltage threshold value.

(A3) In the current limiting system denoted as (A2), each current limiting device may be further configured to shut down when the magnitude of the respective supply voltage of the current limiting device is below a respective undervoltage lockout value of the current limiting device, where each undervoltage lockout value is lower than the first voltage threshold value and the second voltage threshold value.

(A4) In any one of the current limiting systems denoted as (A1) through (A3), the respective supply voltage of each current limiting device may be different from the respective supply voltage of each other current limiting device, when the electric current is flowing through the protected return power path.

(A5) In any one of the current limiting systems denoted as (A1) through (A4), (i) the protected return power path may electrically couple a negative node of an electric power supply to a protected interface, (ii) a forward power path may electrically couple a positive node of the electric power supply to the protected interface, and (iii) the protected interface may be configured to provide an interface for powering a load from the electric power supply via the forward power path and the protected return power path.

(A6) In any one of the current limiting systems denoted as (A1) through (A5), each current limiting device may be further configured to control its respective current limit value such that the respective current limit value of the current limiting device decreases with decreasing magnitude of the respective supply voltage of the current limiting device when the magnitude of the respective supply voltage of the current limiting device is below the first voltage threshold value.

(A7) In any one of the current limiting systems denoted as (A1) through (A6), each current limiting device may be further configured to control its respective current limit value such that the respective current limit value of the current limiting device is a linear function of the magnitude of the respective supply voltage of the current limiting device when the magnitude of the respective supply voltage of the current limiting device is below the first voltage threshold value.

(A8) In any one of the current limiting systems denoted as (A1) through (A6), each current limiting device may be further configured to control its respective current limit value such that the respective current limit value of the current limiting device is a piecewise linear function of the respective magnitude of the supply voltage of the current limiting device when the magnitude of the respective supply voltage of the current limiting device is below the first voltage threshold value.

(A9) In any one of the current limiting systems denoted as (A1) through (A6), each current limiting device may be further configured to control its respective current limit value such that the respective current limit value of the current limiting device is a monotonic non-linear function of the magnitude of the respective supply voltage of the current limiting device when the magnitude of the respective supply voltage of the current limiting device is below the first voltage threshold value.

(B1) A current limiting system includes a plurality of current limiting devices electrically coupled in series to form a protected forward power path where each current limiting device is configured to individually limit magnitude of an electric current flowing through the protected forward power path to a respective current limit value of the current limiting device. Each current limiting device is further configured to control its respective current limit value such that (a) the respective current limit value of the current limiting device is a respective constant current value when a magnitude of a respective supply voltage of the current limiting device is above a first voltage threshold value, the respective supply voltage of the current limiting device being a voltage between (i) a voltage of the protected forward power path at a respective positive supply terminal of the current limiting device and (ii) a voltage of a respective negative power terminal of the current limiting device and (b) the respective current limit value of the current limiting device is less than the respective constant current value of the current limiting device when the magnitude of the respective supply voltage of the current limiting device is below the first voltage threshold value.

(B2) In the current limiting system denoted as (B1), each current limiting device may be further configured to control its respective current limit value such that its respective current limit value is less than the respective constant current value of each current limiting device of the plurality of current limiting devices, when the respective supply voltage of the current limiting device is at a second voltage threshold value that is lower than the first voltage threshold value.

(B3) In the current limiting system denoted as (B2), each current limiting device may be further configured to shut down when the magnitude of the respective supply voltage of the current limiting device is below a respective undervoltage lockout value of the current limiting device, each undervoltage lockout value being lower than the first voltage threshold value and the second voltage threshold value.

(B4) In any one of the current limiting systems denoted as (B1) through (B3), the respective supply voltage of each current limiting device may be different from the respective supply voltage of each other current limiting device, when the electric current is flowing through the protected forward power path.

(B5) In any one of the current limiting systems denoted as (B1) through (B4), (a) the protected forward power path may electrically couple a positive node of an electric power supply to a protected interface, (b) a return power path may electrically couple a negative node of the electric power supply to the protected interface, and (c) the protected interface may be configured to provide an interface for powering a load from the electric power supply via the protected forward power path and the return power path.

(B6) In any one of the current limiting systems denoted as (B1) through (B5), each current limiting device may be further configured to control its respective current limit value such that the respective current limit value of the current limiting device decreases with decreasing magnitude of the respective supply voltage of the current limiting device when the magnitude of the respective supply voltage of the current limiting device is below the first voltage threshold value.

(B7) In any one of the current limiting systems denoted as (B1) through (B6), each current limiting device may be further configured to control its respective current limit value such that the respective current limit value of the current limiting device is a linear function of the magnitude of the respective supply voltage of the current limiting device when the magnitude of the respective supply voltage of the current limiting device is below the first voltage threshold value.

(B8) In any one of the current limiting systems denoted as (B1) through (B6), each current limiting device may be further configured to control its respective current limit value such that the respective current limit value of the current limiting device is a piecewise linear function of the respective magnitude of the supply voltage of the current limiting device when the magnitude of the respective supply voltage of the current limiting device is below the first voltage threshold value.

(B9) In any one of the current limiting systems denoted as (B1) through (B6), each current limiting device may be further configured to control its respective current limit value such that the respective current limit value of the current limiting device is a monotonic non-linear function of the magnitude of the respective supply voltage of the current limiting device when the magnitude of the respective supply voltage of the current limiting device is below the first voltage threshold value.

(C1) A method for limiting magnitude of an electric current flowing through a protected power path formed by a plurality of current limiting devices electrically coupled in series includes (a) at each current limiting device of the plurality of current limiting devices, sensing a respective supply voltage of the current limiting device, the respective supply voltage of the current limiting device being a difference between (i) a voltage at a power terminal of the current limiting device and (ii) a voltage of the protected power path at a supply terminal of the current limiting device, (b) at a first current limiting device of the plurality of current limiting devices, limiting magnitude of the electric current flowing through the protected power path to a constant current limit value in response to a magnitude of the respective supply voltage of the first current limiting device being above a voltage threshold value, and (c) at a second current limiting device of the plurality of current limiting devices, limiting magnitude of the electric current flowing through the protected power path to a reduced current limit value that is smaller than the constant current limit value, in response to a magnitude of the respective supply voltage of the second current limiting device being below the voltage threshold value.

(C2) The method denoted as (C1) may further include decreasing the reduced current limit value in response to a decrease in the magnitude of the respective supply voltage of the second current limiting device.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A current limiting system comprising a plurality of current limiting devices electrically coupled in series to form a protected return power path where each current limiting device is configured to individually limit magnitude of an electric current flowing through the protected return power path to a respective current limit value of the current limiting device, wherein each current limiting device is further configured to control its respective current limit value such that:

the respective current limit value of the current limiting device is a respective constant current value when a magnitude of a respective supply voltage of the current limiting device is above a first voltage threshold value, the respective supply voltage of the current limiting device being a voltage between (i) a voltage of a respective positive power terminal of the current limiting device and (ii) a voltage of the protected return power path at a respective negative supply terminal of the current limiting device; and the respective current limit value of the current limiting device is less than the respective constant current value of the current limiting device when the magnitude of the respective supply voltage of the current limiting device is below the first voltage threshold value.

2. The current limiting system of claim 1, wherein each current limiting device is further configured to control its respective current limit value such that its respective current limit value is less than the respective constant current value of each current limiting device of the plurality of current limiting devices, when the respective supply voltage of the current limiting device is at a second voltage threshold value that is lower than the first voltage threshold value.

3. The current limiting system of claim 2, wherein each current limiting device is further configured to shut down when the magnitude of the respective supply voltage of the current limiting device is below a respective undervoltage lockout value of the current limiting device, each respective undervoltage lockout value being lower than the first voltage threshold value and the second voltage threshold value.

4. The current limiting system of claim 1, wherein the respective supply voltage of each current limiting device is different from the respective supply voltage of each other current limiting device, when the electric current is flowing through the protected return power path.

5. The current limiting system of claim 1, wherein:

the protected return power path electrically couples a negative node of an electric power supply to a protected interface;

a forward power path electrically couples a positive node of the electric power supply to the protected interface; and the protected interface is configured to provide an interface for powering a load from the electric power supply via the forward power path and the protected return power path.

6. The current limiting system of claim 1, wherein each current limiting device is further configured to control its respective current limit value such that the respective current limit value of the current limiting device decreases with decreasing magnitude of the respective supply voltage of the current limiting device when the magnitude of the respective supply voltage of the current limiting device is below the first voltage threshold value.

7. The current limiting system of claim 1, wherein each current limiting device is further configured to control its respective current limit value such that the respective current limit value of the current limiting device is a linear function of the magnitude of the respective supply voltage of the current limiting device when the magnitude of the respective supply voltage of the current limiting device is below the first voltage threshold value.

8. The current limiting system of claim 1, wherein each current limiting device is further configured to control its respective current limit value such that the respective current limit value of the current limiting device is a piecewise linear function of the respective magnitude of the supply voltage of the current limiting device when the magnitude of the respective supply voltage of the current limiting device is below the first voltage threshold value.

9. The current limiting system of claim 1, wherein each current limiting device is further configured to control its respective current limit value such that the respective current limit value of the current limiting device is a monotonic non-linear function of the magnitude of the respective supply voltage of the current limiting device when the magnitude of the respective supply voltage of the current limiting device is below the first voltage threshold value.

10. A current limiting system comprising a plurality of current limiting devices electrically coupled in series to form a protected forward power path where each current limiting device is configured to individually limit magnitude of an electric current flowing through the protected forward power path to a respective current limit value of the current limiting device, wherein each current limiting device is further configured to control its respective current limit value such that:

the respective current limit value of the current limiting device is a respective constant current value when a magnitude of a respective supply voltage of the current limiting device is above a first voltage threshold value, the respective supply voltage of the current limiting device being a voltage between (i) a voltage of the protected forward power path at a respective positive supply terminal of the current limiting device and (ii) a voltage of a respective negative power terminal of the current limiting device and; and the respective current limit value of the current limiting device is less than the respective constant current value of the current limiting device when the magnitude of the respective supply voltage of the current limiting device is below the first voltage threshold value.

11. The current limiting system of claim 10, wherein each current limiting device is further configured to control its respective current limit value such that its respective current limit value is less than the respective constant current value of each current limiting device of the plurality of current limiting devices, when the respective supply voltage of the current limiting device is at a second voltage threshold value that is lower than the first voltage threshold value.

12. The current limiting system of claim 11, wherein each current limiting device is further configured to shut down when the magnitude of the respective supply voltage of the current limiting device is below a respective undervoltage lockout value of the current limiting device, each respective undervoltage lockout value being lower than the first voltage threshold value and the second voltage threshold value.

13. The current limiting system of claim 10, wherein the respective supply voltage of each current limiting device is different from the respective supply voltage of each other current limiting device, when the electric current is flowing through the protected forward power path.

14. The current limiting system of claim 10, wherein:

the protected forward power path electrically couples a positive node of an electric power supply to a protected interface;

a return power path electrically couples a negative node of the electric power supply to the protected interface; and the protected interface is configured to provide an interface for powering a load from the electric power supply via the protected forward power path and the return power path.

15. The current limiting system of claim 10, wherein each current limiting device is further configured to control its respective current limit value such that the respective current limit value of the current limiting device decreases with decreasing magnitude of the respective supply voltage of the current limiting device when the magnitude of the respective supply voltage of the current limiting device is below the first voltage threshold value.

16. The current limiting system of claim 10, wherein each current limiting device is further configured to control its respective current limit value such that the respective current limit value of the current limiting device is a linear function of the magnitude of the respective supply voltage of the current limiting device when the magnitude of the respective supply voltage of the current limiting device is below the first voltage threshold value.

17. The current limiting system of claim 10, wherein each current limiting device is further configured to control its respective current limit value such that the respective current limit value of the current limiting device is a piecewise linear function of the respective magnitude of the supply voltage of the current limiting device when the magnitude of the respective supply voltage of the current limiting device is below the first voltage threshold value.

18. The current limiting system of claim 10, wherein each current limiting device is further configured to control its respective current limit value such that the respective current limit value of the current limiting device is a monotonic non-linear function of the magnitude of the respective supply voltage of the current limiting device when the magnitude of the respective supply voltage of the current limiting device is below the first voltage threshold value.

19. A method for limiting magnitude of an electric current flowing through a protected power path formed by a plurality of current limiting devices electrically coupled in series, the method comprising:

at each current limiting device of the plurality of current limiting devices, sensing a respective supply voltage of the current limiting device, the respective supply voltage of the current limiting device being a difference between (i) a voltage at a power terminal of the current limiting device and (ii) a voltage of the protected power path at a supply terminal of the current limiting device;

at a first current limiting device of the plurality of current limiting devices, limiting magnitude of the electric current flowing through the protected power path to a constant current limit value in response to a magnitude of the respective supply voltage of the first current limiting device being above a voltage threshold value; and at a second current limiting device of the plurality of current limiting devices, limiting magnitude of the electric current flowing through the protected power path to a reduced current limit value that is smaller than the constant current limit value, in response to a magnitude of the respective supply voltage of the second current limiting device being below the voltage threshold value.

20. The method of claim 19, further comprising decreasing the reduced current limit value in response to a decrease in the magnitude of the respective supply voltage of the second current limiting device.

* * * * *